United States Patent
Nagoshi et al.

(10) Patent No.: US 8,350,615 B2
(45) Date of Patent: Jan. 8, 2013

(54) MOTOR DRIVING APPARATUS HAVING RELIABLE WAKEUP ARRANGEMENT

(75) Inventors: Hiroto Nagoshi, Hitachinaka (JP); Masashi Saito, Hitachinaka (JP)

(73) Assignee: Hitachi Automotive Systems, Ltd., Ibaraki (JP)

(*) Notice: Subject to any disclaimer, the term of this patent is extended or adjusted under 35 U.S.C. 154(b) by 113 days.

(21) Appl. No.: 12/952,501

(22) Filed: Nov. 23, 2010

(65) Prior Publication Data
US 2011/0128066 A1    Jun. 2, 2011

(30) Foreign Application Priority Data

Nov. 30, 2009   (JP) ................................. 2009-270964
Apr. 27, 2010   (JP) ................................. 2010-101597

(51) Int. Cl.
*B60R 22/48*     (2006.01)
*B60R 21/015*    (2006.01)

(52) U.S. Cl. .......... 327/518; 180/268; 701/45; 280/807; 297/217.3; 297/477; 327/544

(58) Field of Classification Search .................. None
See application file for complete search history.

(56) References Cited

U.S. PATENT DOCUMENTS

| | | | |
|---|---|---|---|
| 7,403,106 B2* | 7/2008 | Yanagi | 340/457.1 |
| 2003/0117018 A1* | 6/2003 | Young | 307/10.1 |
| 2011/0074567 A1* | 3/2011 | Miyamori et al. | 340/457.1 |

FOREIGN PATENT DOCUMENTS

JP    2008-238840    10/2008

* cited by examiner

*Primary Examiner* — Lincoln Donovan
*Assistant Examiner* — Terry L Englund
(74) *Attorney, Agent, or Firm* — Antonelli, Terry, Stout & Kraus, LLP.

(57) ABSTRACT

If a power supply is provided to a circuit necessary to control a switch for switching a path after wakeup, or if a buckle switch is switched while a microcomputer is asleep, an electrical current necessary for reliable operation of the buckle switch cannot be supplied during sleep, so that the buckle switch will not operate normally. This creates the possibility that wakeup cannot be performed. To permit the electrical current necessary for reliable operation of the buckle switch to be secured if the buckle switch is switched while the microcomputer is asleep, an FET capable of being kept ON or OFF by a power supply acting during sleep, a resistor connected with the FET, and a resistor of large resistance for blocking excessive dark current if the buckle switch is connected are arranged in parallel. The combined resistance of the parallel combination of these elements is used as a pull-up resistance at the input of a control unit.

8 Claims, 10 Drawing Sheets

MOTOR DRIVING APPARATUS HAVING RELIABLE WAKEUP ARRANGEMENT

BACKGROUND OF THE INVENTION

If a power supply is provided to a circuit necessary to control a switch for switching a path after wakeup, or if a buckle switch is switched while a microcomputer is asleep, an electrical current necessary for reliable operation of the buckle switch cannot be supplied during sleep, so that the buckle switch will not operate normally. This creates the possibility that wakeup cannot be performed. To permit the electrical current necessary for reliable operation of the buckle switch to be secured if the buckle switch is switched while the microcomputer is asleep, provided are: an FET capable of being kept ON or OFF by a power supply acting during sleep, a first resistor connected in series with the FET, and a second resistor of large resistance for blocking excessive dark current if the buckle switch is connected. The second resistor is connected in parallel with the series connection of the first resistor and the FET. The combined resistance of the parallel combination of these elements is used as a pull-up resistance at the input of a control unit.

SUMMARY OF THE INVENTION

In the related art, however, power supply for the circuit necessary to control the switch for switching the path is provided after wakeup and, therefore, if the buckle switch is switched while the microcomputer is asleep, the current necessary for reliable operation of the buckle switch cannot be supplied during the sleep. The related art is based on the concept that the path for the current necessary for reliable operation of the switch is secured by a circuit that operates when the microcomputer has woken up. Therefore, there is the problem that the buckle switch might not operate normally and thus the wakeup operation cannot be performed.

It is an object of the present invention to provide a motor driving apparatus which is for use with a seat belt and which can perform a wakeup operation normally even if an oxide film is formed on the contacts of a buckle switch.

Accordingly, the present invention provides a motor driving apparatus connected with a battery and a buckle switch in use, the apparatus has a control unit including a microcomputer and a wakeup circuit for waking up the microcomputer when it is asleep according to an input signal whose logic state is switched by switching of the state of the buckle switch. The apparatus further includes a transistor capable of being kept ON or OFF by a backup memory even if the microcomputer is asleep, a first resistor connected in series with the transistor, and a second resistor connected in parallel with a series connection of the first resistor and the transistor.

The present invention also provides a motor driving apparatus having a first connecting terminal connected with a battery, a second connecting terminal connected with a buckle switch, and a control unit incorporating a microcomputer. The control unit has a wakeup circuit for waking up the microcomputer when it is asleep according to an input signal whose logic state is switched based on a switching signal for switching the state of the buckle switch, the switching signal being entered from the second connecting terminal. The control unit further includes a transistor to which a battery voltage from the first connecting terminal is applied and which is capable of being kept ON or OFF by a backup memory even if the microcomputer is asleep, a first resistor connected in series with the transistor, and a second resistor connected in parallel with a series connection of the first resistor and the transistor. In the control unit, a transistor for level shifting and a buffer is connected between an input terminal to which the input signal is applied and the wakeup circuit. A second transistor for current amplification, a third resistor being a load resistor for the second transistor and connected in series with the second transistor, and a fourth resistor connected in parallel with the third resistor are connected between the input terminal of the control unit and the second connecting terminal.

According to the invention, a seat belt motor driving apparatus can be offered which can perform a wakeup operation normally if an oxide film is formed on the contacts of the buckle switch.

Other objects, features and advantages of the invention will become apparent from the following description of the embodiments of the invention taken in conjunction with the accompanying drawings.

DETAILED DESCRIPTION OF THE INVENTION

The preferred embodiments of the present invention are hereinafter described with reference to the accompanying drawings.

Embodiment 1

Figure 1:
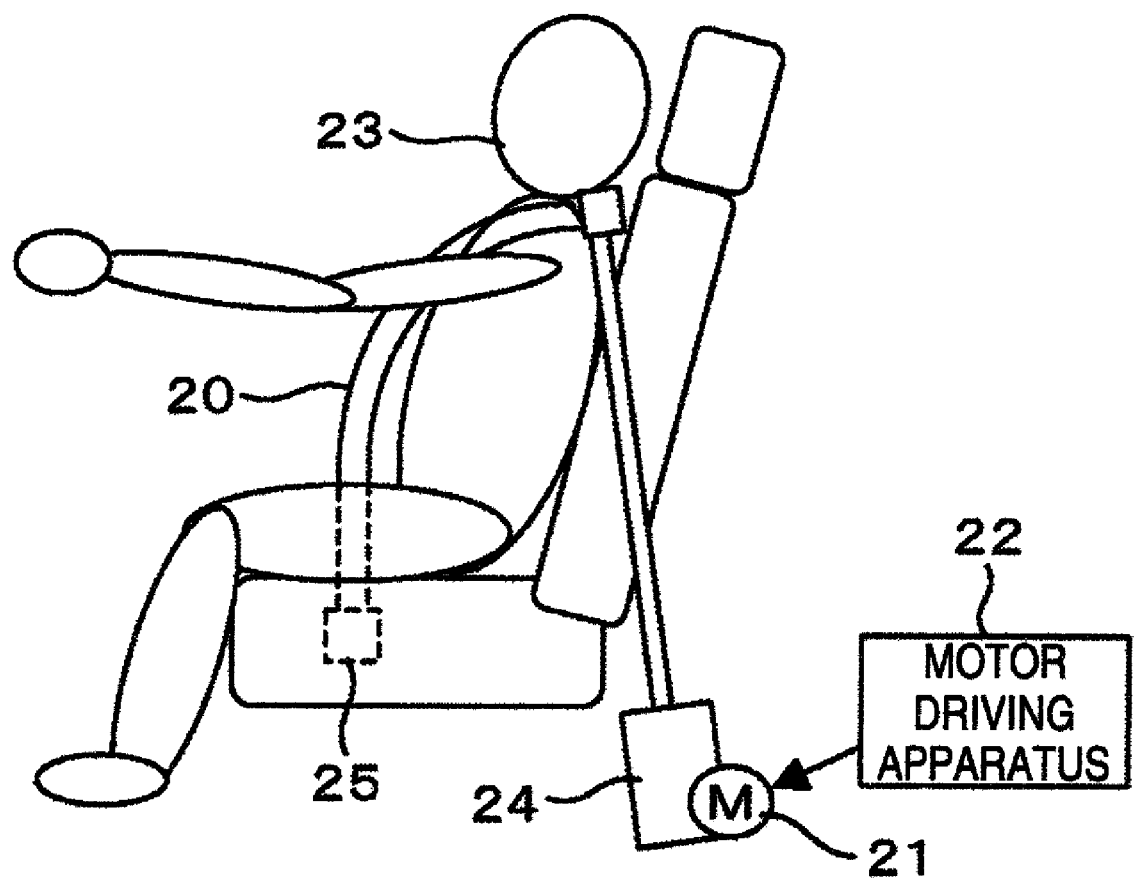
FIG. 1 is a schematic representation of a seat belt system according to one embodiment of the present invention.

FIG. 1 is a schematic representation of a seat belt system according to Embodiment 1 of the present invention.

In the present system, a motor driving apparatus 22 drives a motor 21 to wind up a seat belt 20.

The operation for winding up the seat belt serves various functions. One function is to increase the constraint force in emergency mode in order to provide safety for the occupant 23. Another function is to provide automatic comfortable fitting when the seat belt is mounted to a buckle 25 in order to improve the comfort of the occupant 23. A further function is to provide automatic loading into a retractor 24 for the seat belt 20 in order to improve the aesthetic appearance of the vehicle.

In the automatic comfortable fitting mode and automatic loading mode, the operation that would normally be performed when the ignition of the vehicle is off is required. Therefore, the motor driving apparatus 22 is energized from the vehicle's battery even when the ignition is off.

To prevent death of the vehicle's battery, the motor driving apparatus 22 suppresses the power consumption when it is not in operation if a power supply is being provided from the battery.

Figure 2:
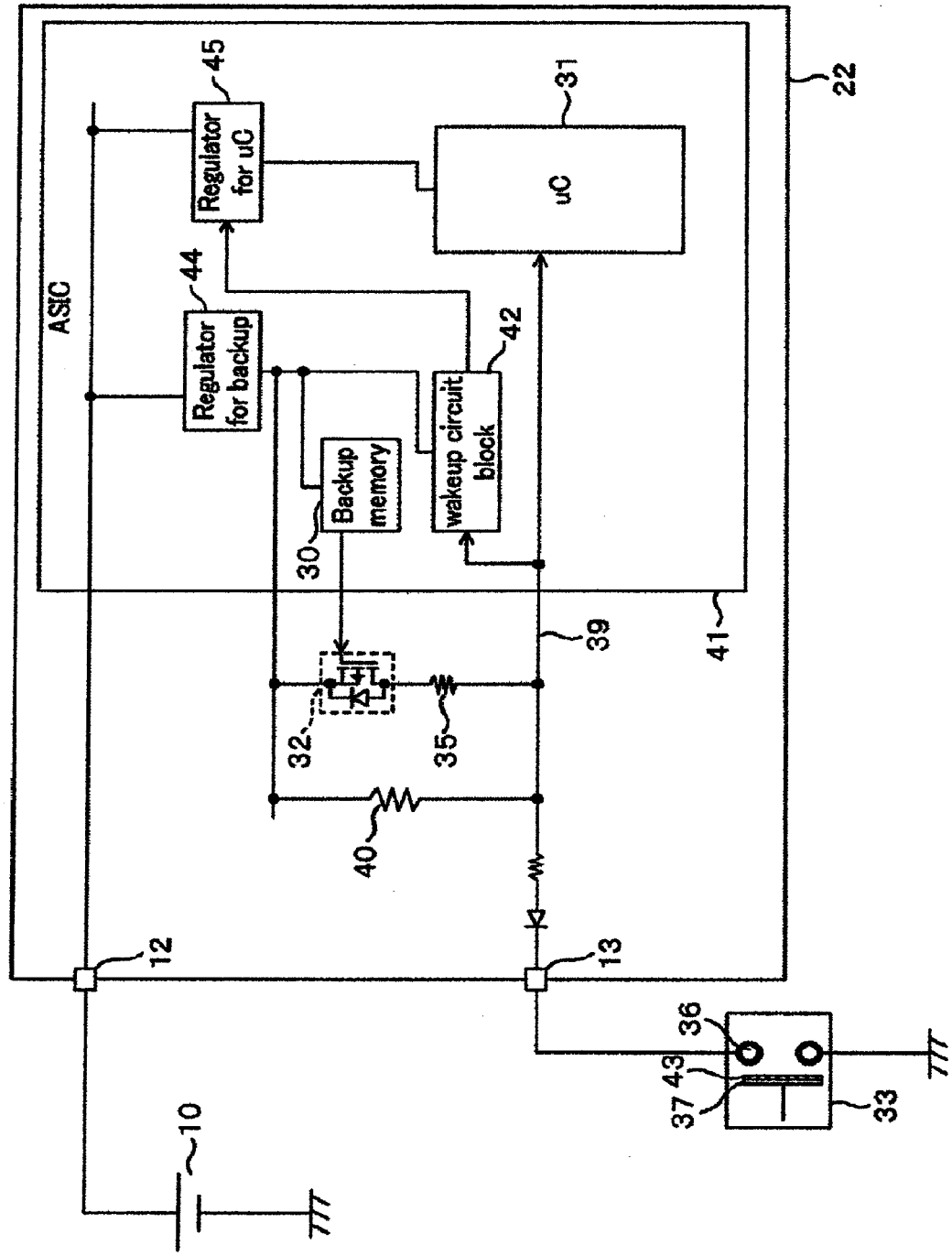
FIG. 2 is a circuit diagram, partially in block form, of a seat belt motor driving apparatus according to Embodiment 1 of the invention.

The internal circuitry of the motor driving apparatus 22 according to the present embodiment is shown in FIG. 2, the apparatus 22 being connected with a battery 10 and a buckle switch 33 in use. The apparatus 22 has a first connecting terminal 12 connected with the battery 10 and a second connecting terminal 13 connected with the buckle switch 33. The battery voltage is applied from the first connecting terminal 12. An input signal indicating a logic state of HIGH or LOW is applied from the second connecting terminal 13.

When the state of the buckle switch 33 is ON, an electrical current is allowed to flow from the terminal 12 via a regulator 44 for backup and a current path 50 (see FIG. 3) that includes an analog switch or a transistor and a resistor 35 having a low resistance of 1Ω to hundreds of ohms (e.g., 500Ω) to secure a predetermined amount of terminal current necessary for reliable operation of the switch. The path 50 is formed when current path shutoff means including the analog switch or the transistor is activated.

A microcomputer (μC) 31 is driven by a current supplied from the terminal 12 via a regulator 45 for μC. When the microcomputer 31 goes to sleep while the buckle switch 33 is kept ON, the microcomputer 31 turns off an FET (field-effect transistor) 32 that is the transistor acting as the current path shutoff means controlled by a backup memory 30 which is recording and storing means operating when the microcomputer is asleep. As a result, the current flowing from the resistor 35 is shut off. However, the current 38 (see FIG. 3) flowing through the buckle switch 33 is maintained by a current path 51 (FIG. 3) which is formed when the current path shutoff means including the analog switch or transistors is deactivated and which passes through a resistor 40 having a high resistance (such as more than tens of kilohms (e.g., 1 MΩ)), because the high-resistance resistor 40 is connected. Under this condition, the contacts 36 and 37 of the buckle switch 33 are kept in contact with each other. Therefore, any oxide film which would impair the reliability of operation of the buckle switch 33 is not formed. The logic state of the input signal 39 to an ASIC (application-specific integrated circuit) 41 incorporating the microcomputer is kept LOW.

Since the backup memory 30 is made of a CMOS logic device, little power is consumed in maintaining the control signal for the FET 32. Because a wakeup circuit 42 picking up a variation in the input signal 39 is also made of a CMOS logic device, almost no power consumption occurs. The wakeup circuit 42 forms a means for detecting switching of the input signal to the ASIC 41 and an informing means. The resistance of the resistor 40 is set to a necessary and sufficient level to suppress the dark current. Consequently, it is possible to prevent death of the vehicle's battery.

Figure 3:
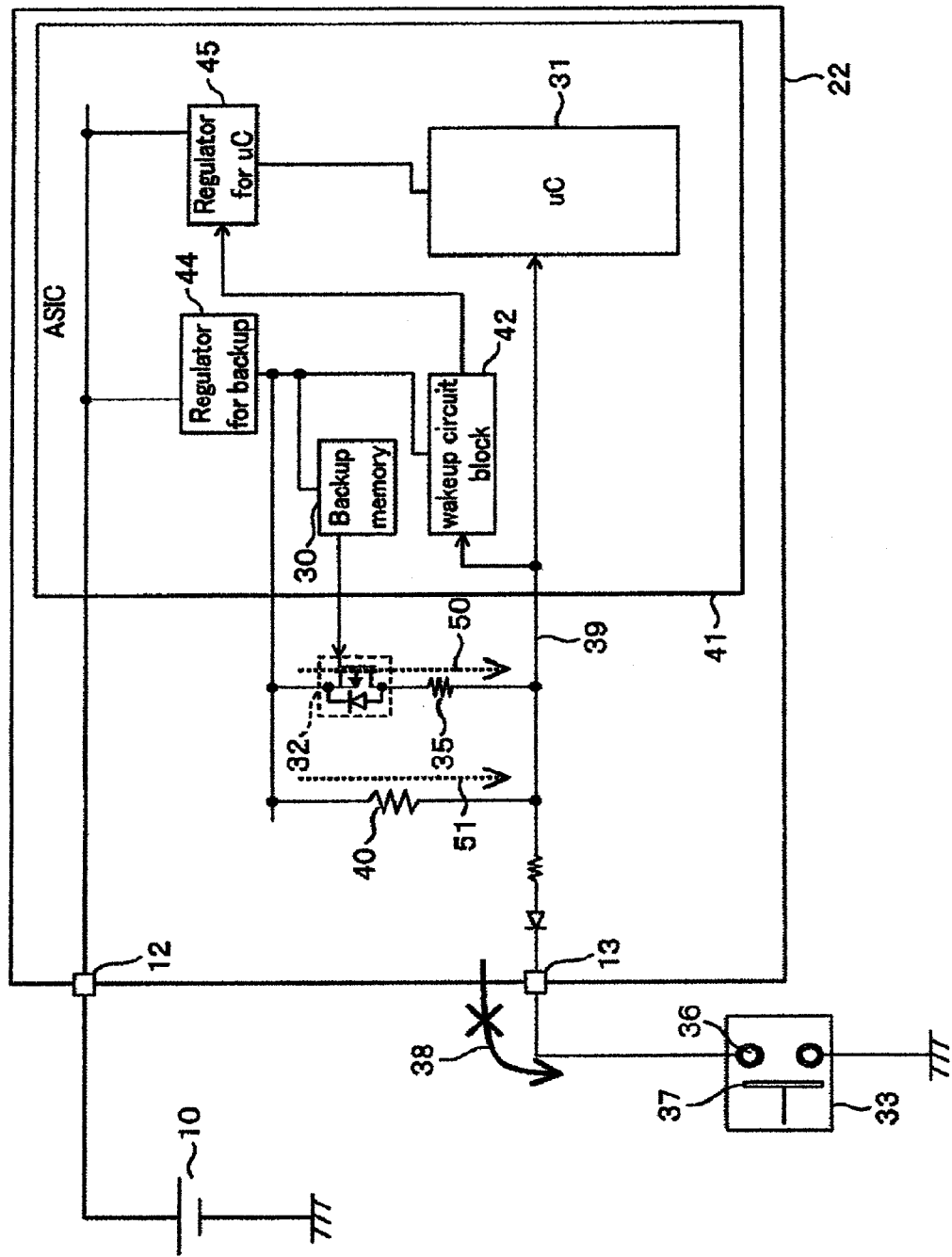
FIG. 3 is a circuit diagram similar to FIG. 2, but in which the buckle switch is open.

During sleep, if the buckle switch 33 is switched from ON to OFF, the current 38 is cut off. The logic state of the input signal 39 to the ASIC 41 incorporating the microcomputer is switched to HIGH by the pull-up resistor 40 (FIG. 3). The wakeup circuit 42 inside the ASIC 41 picks up this variation and wakes up the microcomputer 31. After the wakeup, the microcomputer 31 can recognize the logic LOW state of the input signal 39 and perform given processing. Where contrivances are made to record the state of the buckle switch prior to the sleeping state in the remaining region of the backup memory 30, if a wakeup operation should be performed erroneously, the microcomputer 31 can recognize the wakeup operation as erroneous and so the reliability of operation of the motor driving apparatus 22 can be enhanced.

Figure 4:
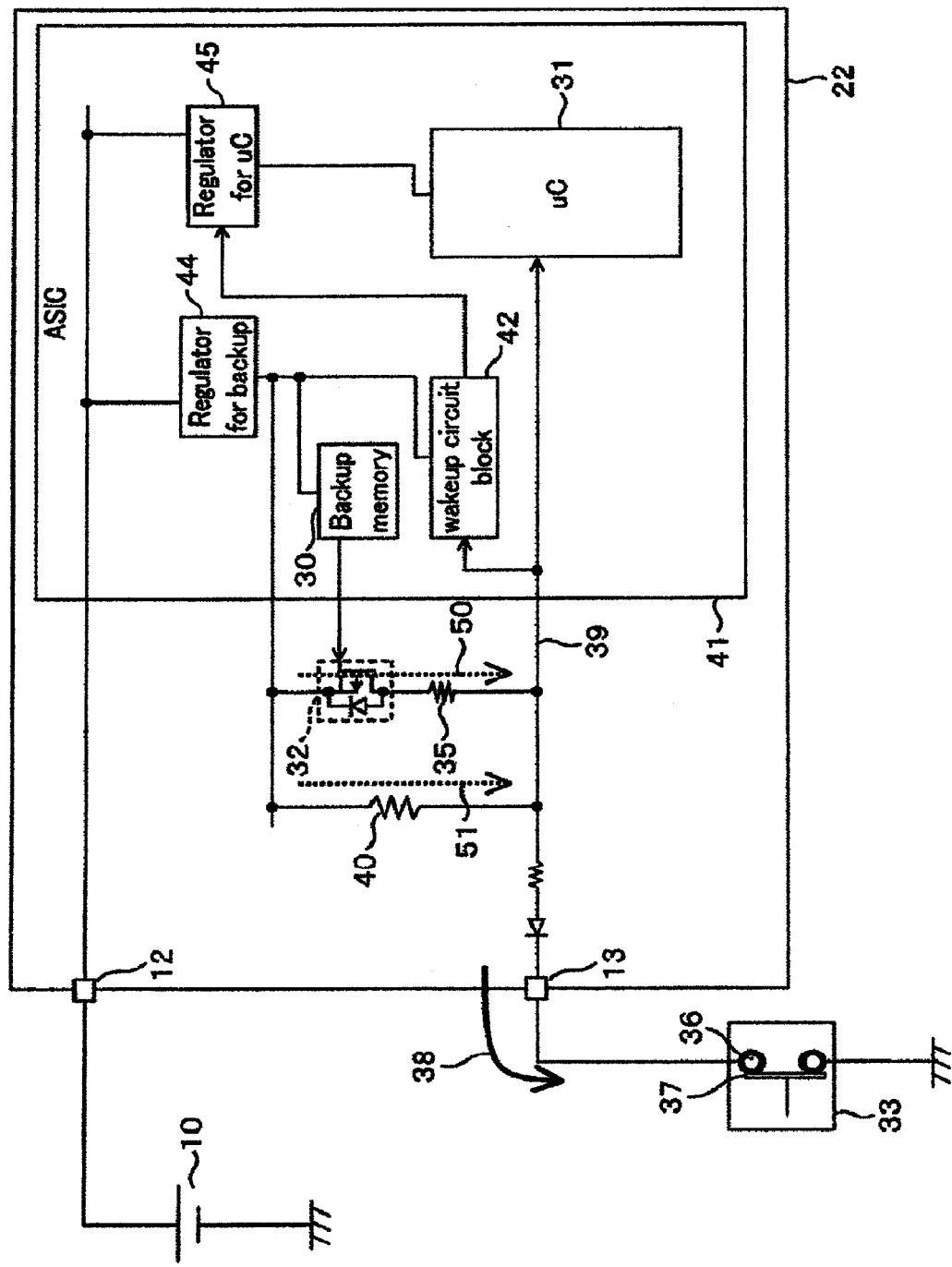
FIG. 4 is a circuit diagram similar to FIG. 3, but in which the motor driving apparatus is asleep.

When the microcomputer goes to sleep while the buckle switch 33 is kept ON, the microcomputer 31 turns on the FET 32 that is controlled by the backup memory 30. The logic state of the input signal 39 to the ASIC 41 is pulled up by the combined resistance of the resistors 35 and 40 and kept at the logic HIGH state (FIG. 4). If the buckle switch is allowed to stand for a long time under this condition, a thin oxide film 43 may be formed on the contacts 36 and 37 of the buckle switch 33 depending on conditions.

Since the backup memory 30 is made of a CMOS logic device, almost no electric power is expended in holding the control signal for the FET 32. Also, the wakeup circuit 42 picking up variations in the input signal 39 is made of a CMOS logic device and, therefore, almost no power consumption occurs. When the buckle switch 33 is ON, the resistor 35 permits flow of a large amount of current. In this case, the microcomputer is asleep while the switch 33 is kept OFF and so the power consumption of the motor driving apparatus 22 is suppressed to a low level.

Figure 5:
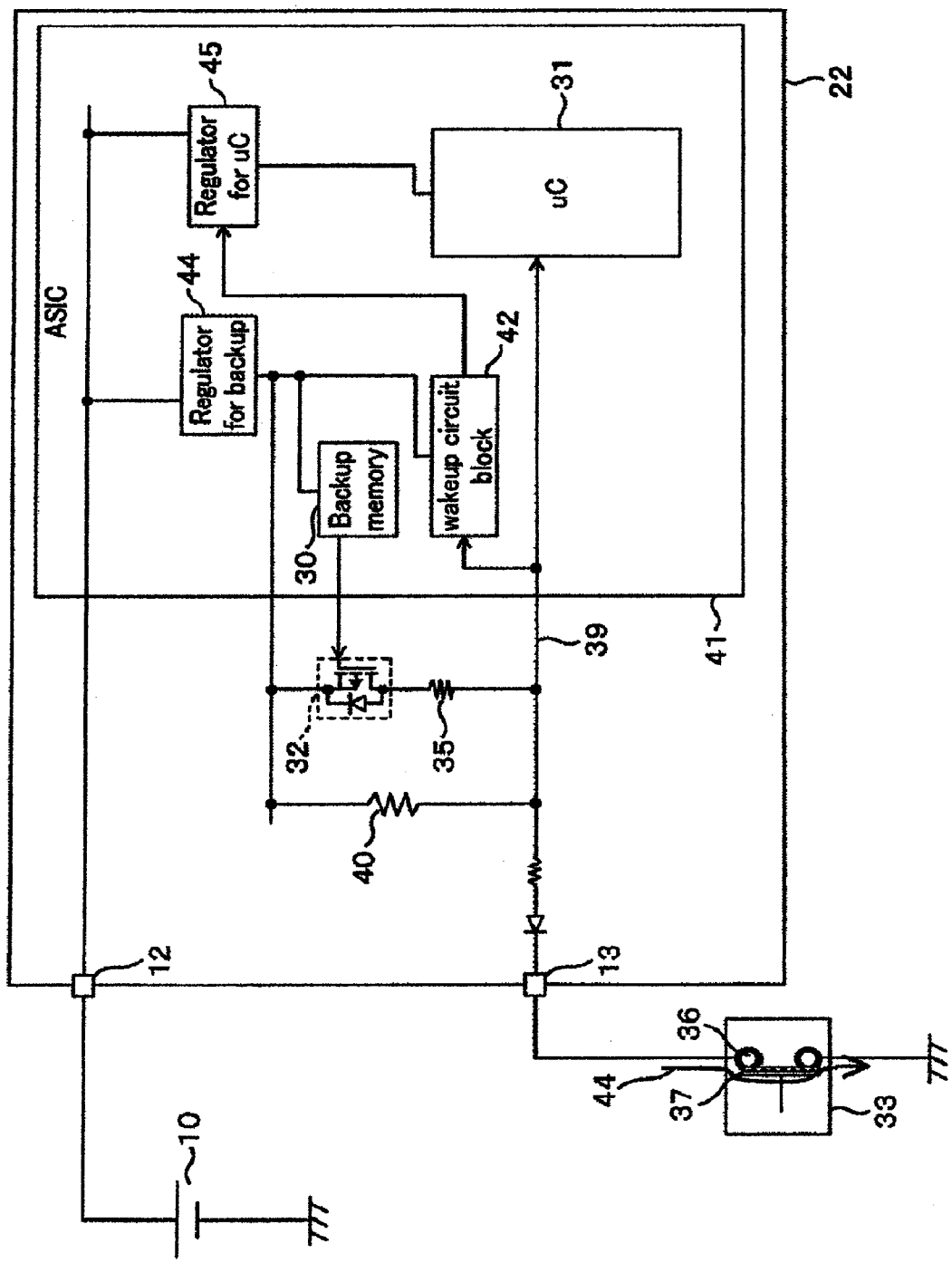
FIG. 5 is a circuit diagram similar to FIG. 2, but in which the motor driving apparatus is asleep.

During sleep, if the buckle switch 33 is switched from OFF to ON, an electrical current 44 (FIG. 5) flowing through the resistors 40 and 35 switches the logic state of the input signal 39 to the ASIC 41 from HIGH to LOW. The current 44 is used to destroy the oxide film formed on the internal contacts of the buckle switch. The wakeup circuit 42 in the ASIC 41 incorporating the microcomputer 31 picks up this change and wakes up the microcomputer. After the wakeup, the microcomputer 31 can recognize the logic HIGH state of the input signal 39 and perform given processing.

The resistance value of the resistor 35 is so selected that the current value of the current 44 obtained at this time is high enough to destroy the thin oxide film 43 formed on the contacts 36 and 37 of the buckle switch 33. Consequently, the oxide film 43 is destroyed, so that the reliability of the operation of the buckle switch 33 can be maintained. Hence, a reliable wakeup operation can be performed.

Under normal operation (i.e., during wakeup), the microcomputer 31 preferably keeps ON the FET 32 controlled by the backup memory 30 because formation of the oxide film 43 on the contacts of the buckle switch 33 is prevented. Similarly, the initial value in the backup memory 30 may be so set as to turn on the FET 32. Consequently, if the power supply to the motor driving apparatus 22 should be momentarily cut off due to disconnection of a battery terminal and the memory 30 be cleared, the reliability of the operation of the buckle switch 33 is secured. Whenever the power supply is cut off instantaneously, the operation for waking up the microcomputer 31 is performed and, therefore, the possibility of battery death does not arise.

Figure 6:
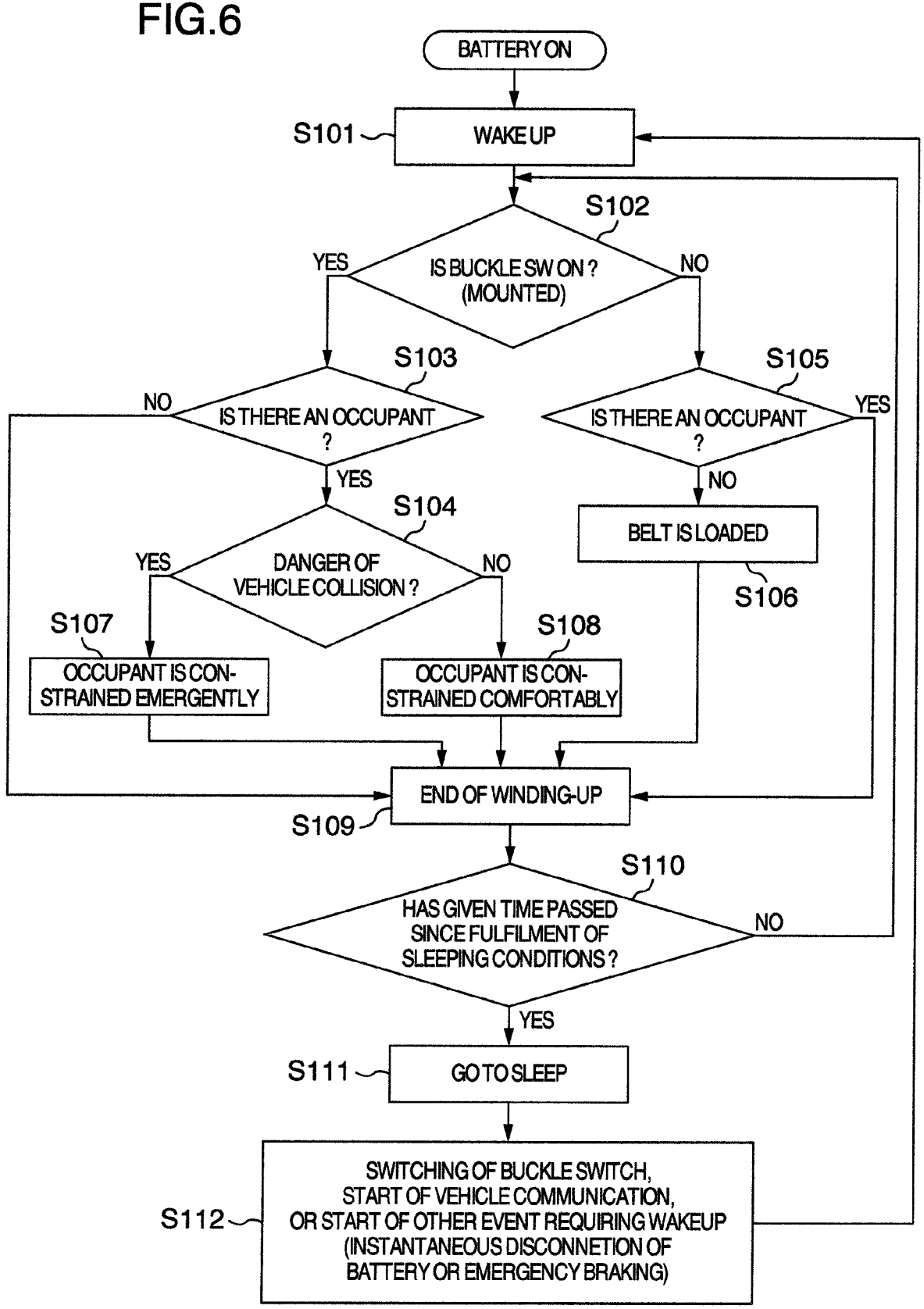
FIG. 6 is a flowchart illustrating control operations of the seat belt motor driving apparatus according to Embodiment 1.

FIG. 6 illustrates a sequence of control operations in Embodiment 1.

In the present embodiment, if the battery is connected, a power supply is started to be provided without waiting for the ignition to be turned ON and the microcomputer is woken up (S101). After the wakeup, the microcomputer 31 judges the state of the buckle switch 33 (S102). If the buckle switch 33 is ON, a decision is made as to whether or not there is an occupant (S103). If there is an occupant, a decision is made as to whether there is a danger of collision of the vehicle (S104). If there is no occupant, the motor is controlled to wind up the belt and the processing is terminated (S109). If the decision at S104 is YES (i.e., there is a danger of collision of the vehicle), the occupant is constrained emergently (S107). If the decision is that there is no danger of collision of the vehicle, the occupant is constrained comfortably (S108). After the constraint, the motor is controlled to wind up the belt in either case, and the processing is terminated (S109). If the buckle switch 33 is OFF, a decision is made as to whether there is an occupant (S105). If there is no occupant, the seat belt is retracted and loaded (S106). If there is an occupant, the motor is controlled to wind up the belt, and the processing is terminated (S109). After the end of the operation for controlling the motor to wind up the belt, an operation for controlling the motor to wind up the belt is performed appropriately according to information about the buckle switch 33 and information offered by a vehicle communication. A decision is made as to whether or not the operation for controlling the motor to wind up the belt was done after a lapse of a given time since the fulfillment of the sleeping conditions (S110). If the operation for controlling the motor to wind up the belt has not been done, the microcomputer is put to sleep to prevent battery death (S111). If the operation for controlling the motor to wind up the belt was done, control returns to the decision at step S102, where the state of the buckle switch 33 is judged.

Then, a decision is made as to whether restoring from the sleeping condition is done (S112). A factor causing the restoration from the sleeping condition is switching of the battery switch 33. Another factor is that a vehicle communication has been started. A further factor is that the battery is disconnected instantaneously. A still factor is that the brakes are applied emergently.

The FET 32 can be replaced by an actively switchable device such as a PNP transistor. Furthermore, the backup memory 30 can be replaced by a storage device of low power consumption such as an EEPROM or flip-flop circuit.

The advantages of the present invention can be applied to general switches having mechanically actuated open-close points (such as vehicle doors and windows), as well as to buckle switches.

One feature of the present invention is that the motor driving apparatus 22 connected with the battery 10 and buckle switch 33 in use has the control unit 41, the FET 32 being the transistor capable of being kept ON or OFF by the backup memory 30 if the microcomputer is asleep, the resistor 35 connected in series with the FET 32, and the resistor 40 connected in parallel with a series connection of the resistor 35 and the FET 32, it being noted that the control unit 41 has the microcomputer 31 and the wakeup circuit 42 for waking up the microcomputer 31 when it is asleep according to the input signal whose logic state is switched by the state of the buckle switch 33. In particular, if the buckle switch 33 is switched while the microcomputer 31 is asleep, the resistor 35 connected in series with the FET 32 being capable of being kept ON or OFF by the power supply provided during sleeping and the resistor 40 whose resistance value is increased to prevent flow of excessive dark current if the buckle switch 33 is connected are disposed in parallel so that the current necessary for reliable operation of the buckle switch 33 can be secured.

Because of this configuration, if the microcomputer goes to sleep while the buckle switch is OFF, the state is maintained for a long time, and an oxide film is formed on the contacts of the buckle switch, then the oxide film is destroyed at the moment when the buckle switch is switched from OFF to ON. Because the current necessary for reliable operation of the buckle switch can be flowed through it, the wakeup can be performed normally.

Embodiment 2

Figure 7:
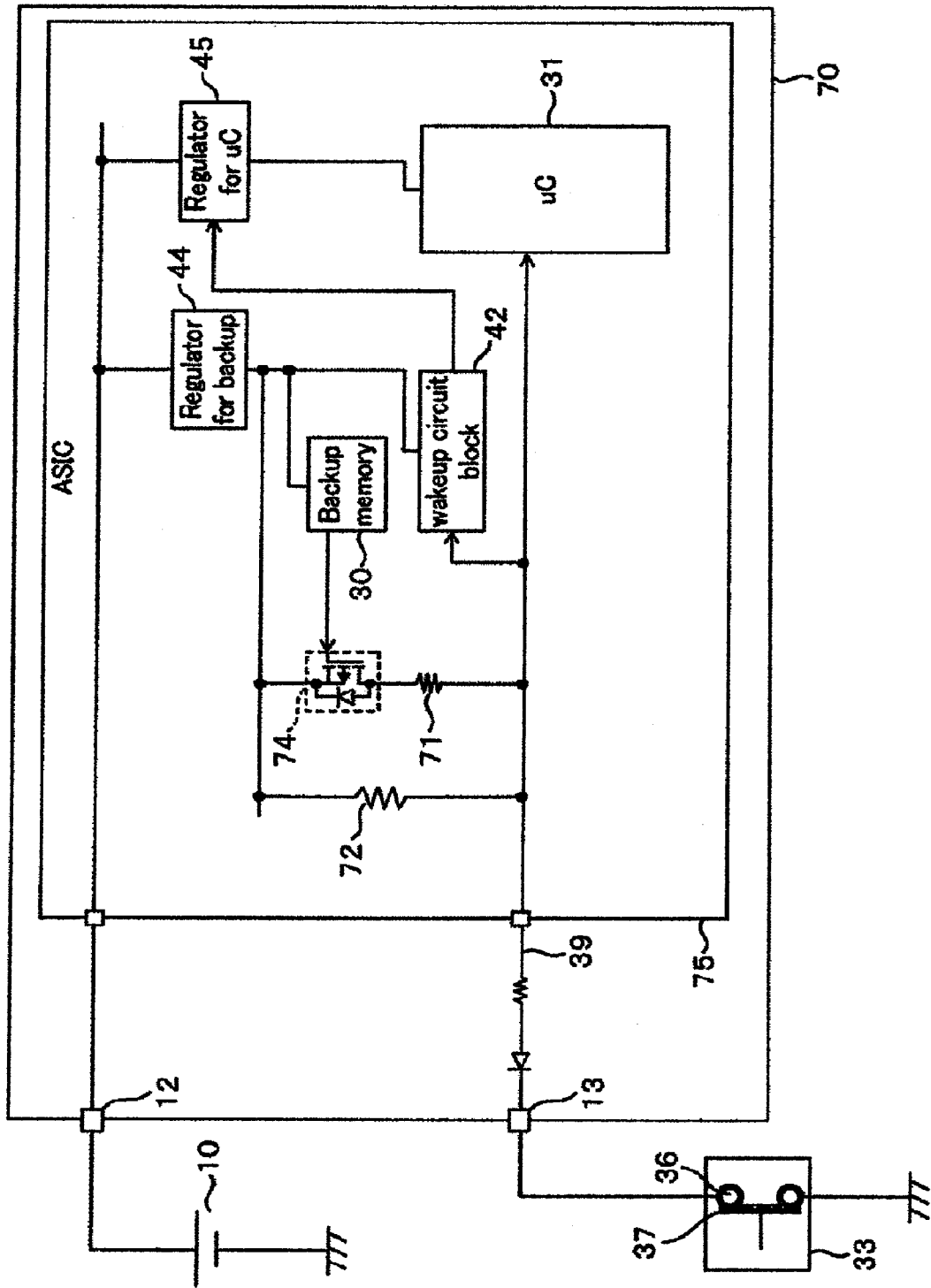
FIG. 7 is a circuit diagram showing the internal circuitry of a seat belt motor driving apparatus according to Embodiment 2.

FIG. 7 shows the internal structure of a motor driving apparatus, 70, according to Embodiment 2.

Embodiment 2 is similar in structure and control methods to Embodiment 1 except that a resistor 71 of low resistance value of about 1Ω to hundreds of ohms (e.g., 500Ω), a resistor 72 of high resistance value of tens of kilohms or more (e.g., 1 MΩ), and an FET 74 are incorporated within an ASIC 75 incorporating a microcomputer 31. The low-resistance resistor 71 in the ASIC supplies an electrical current when the buckle switch 33 is OFF. The high-resistance resistor 72 in the ASIC supplies an electrical current when the buckle switch 33 is ON. The FET 74 in the ASIC is controlled by the backup memory 30 and forms means for cutting off the current path.

Embodiment 3

Figure 8:
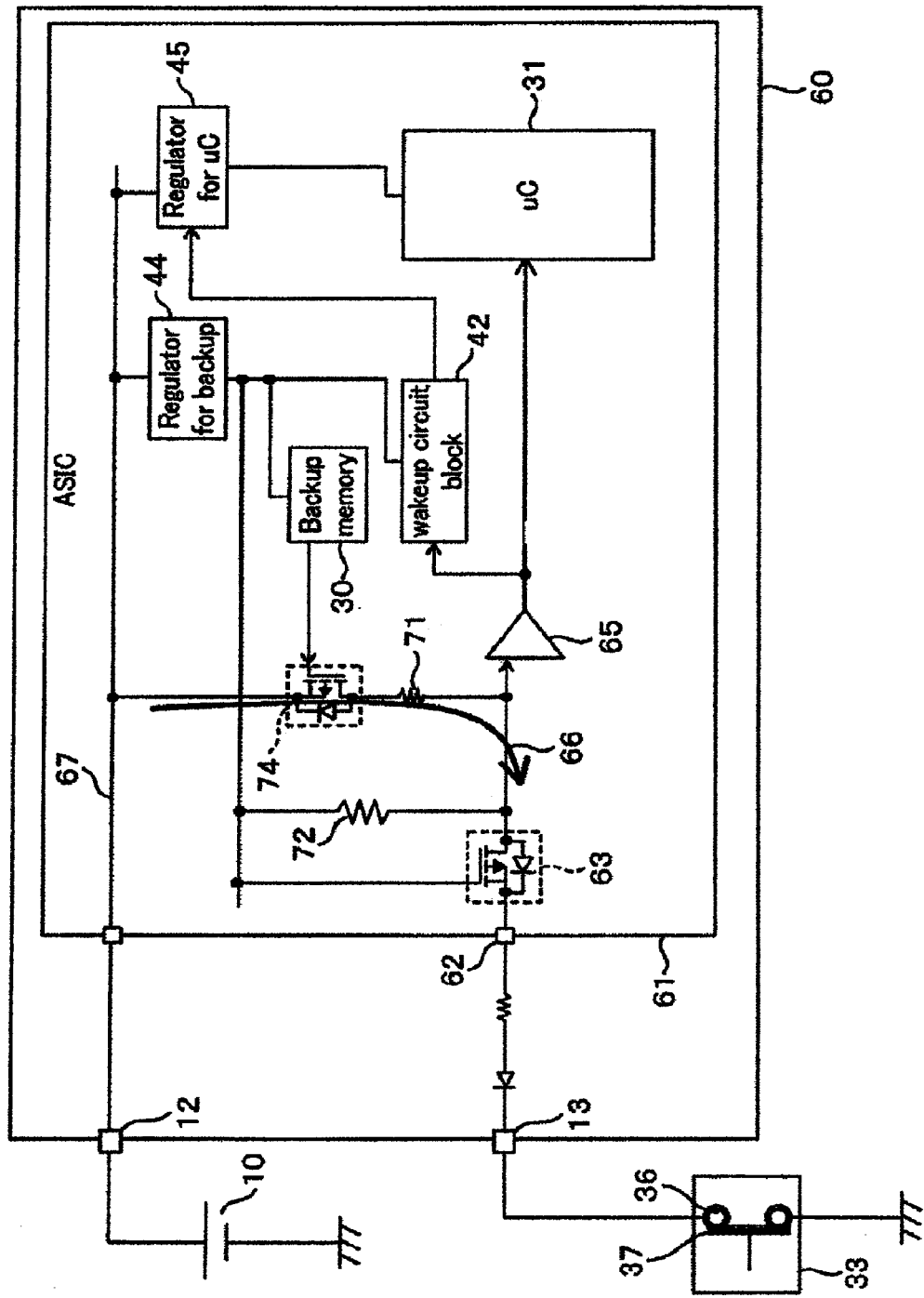
FIG. 8 is a circuit diagram showing the internal circuitry of a seat belt motor driving apparatus according to Embodiment 3.

FIG. 8 shows the internal structure of a motor driving apparatus, 60, according to Embodiment 3.

An ASIC 61 incorporating a microcomputer 31 has an input pin 62 withstanding high voltages. To make the withstand voltage of the input pin 62 higher than the battery voltage, an FET 63 for level shifting and the microcomputer 31 are connected via a buffer 65. An electrical current 66 for securing the reliability of operation of the buckle switch 33 is drawn from the battery voltage 67. The current 66 is used to destroy the oxide film formed on the internal contacts of the buckle switch. Consequently, high voltage resistance is imparted to the input pin 62 of the ASIC 61 having the microcomputer therein. Thus, it is easy to secure the current 66. The concepts for reducing the dark current and improving the reliability of operation of the buckle switch and control methods therefor are the same as for Embodiment 1.

Embodiment 4

Figure 9:
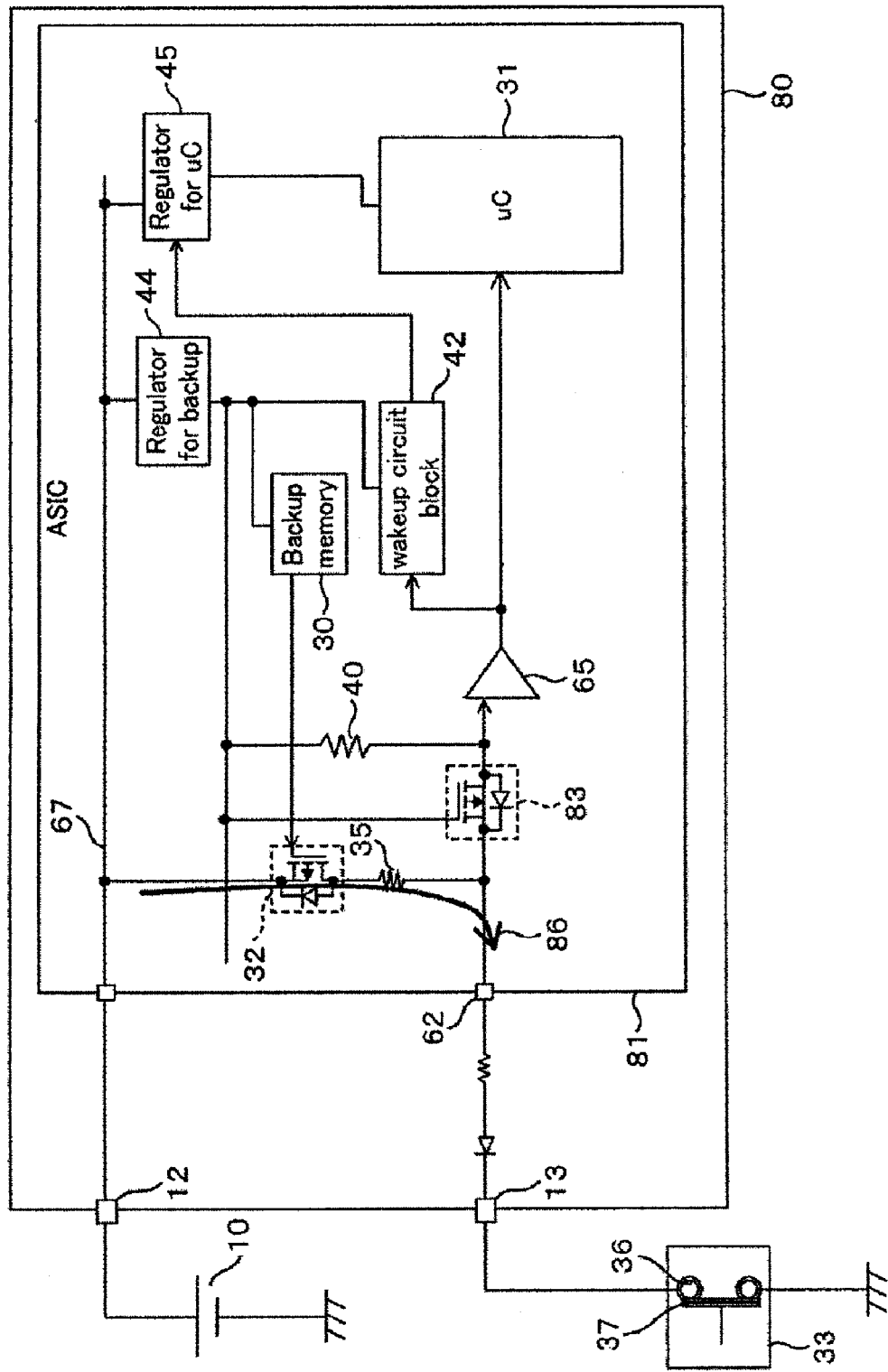
FIG. 9 is a circuit diagram showing the internal circuitry of a seat belt motor driving apparatus according to Embodiment 4.

FIG. 9 shows the internal structure of a motor driving apparatus, 80, according to Embodiment 4. An electrical current 86 for securing the reliability of operation of the buckle switch 33 is drawn from the battery voltage 67 and holds the voltage across the buckle switch 33 at the battery voltage 67. The current 86 is used to destroy the oxide film formed on the internal contacts of the buckle switch. An FET 83 for level shifting is disposed to protect the low-current components inside an ASIC 81 incorporating a microcomputer against the battery voltage 67. This imparts high voltage resistance to the input pin 62 of the ASIC 81. It is easy to secure the current 86 and voltages necessary for reliable operation of the buckle switch 33. The concepts for reducing the dark current and improving the reliability of operation of the buckle switch and control methods therefor are the same as for Embodiment 1.

Embodiment 5

Figure 10:
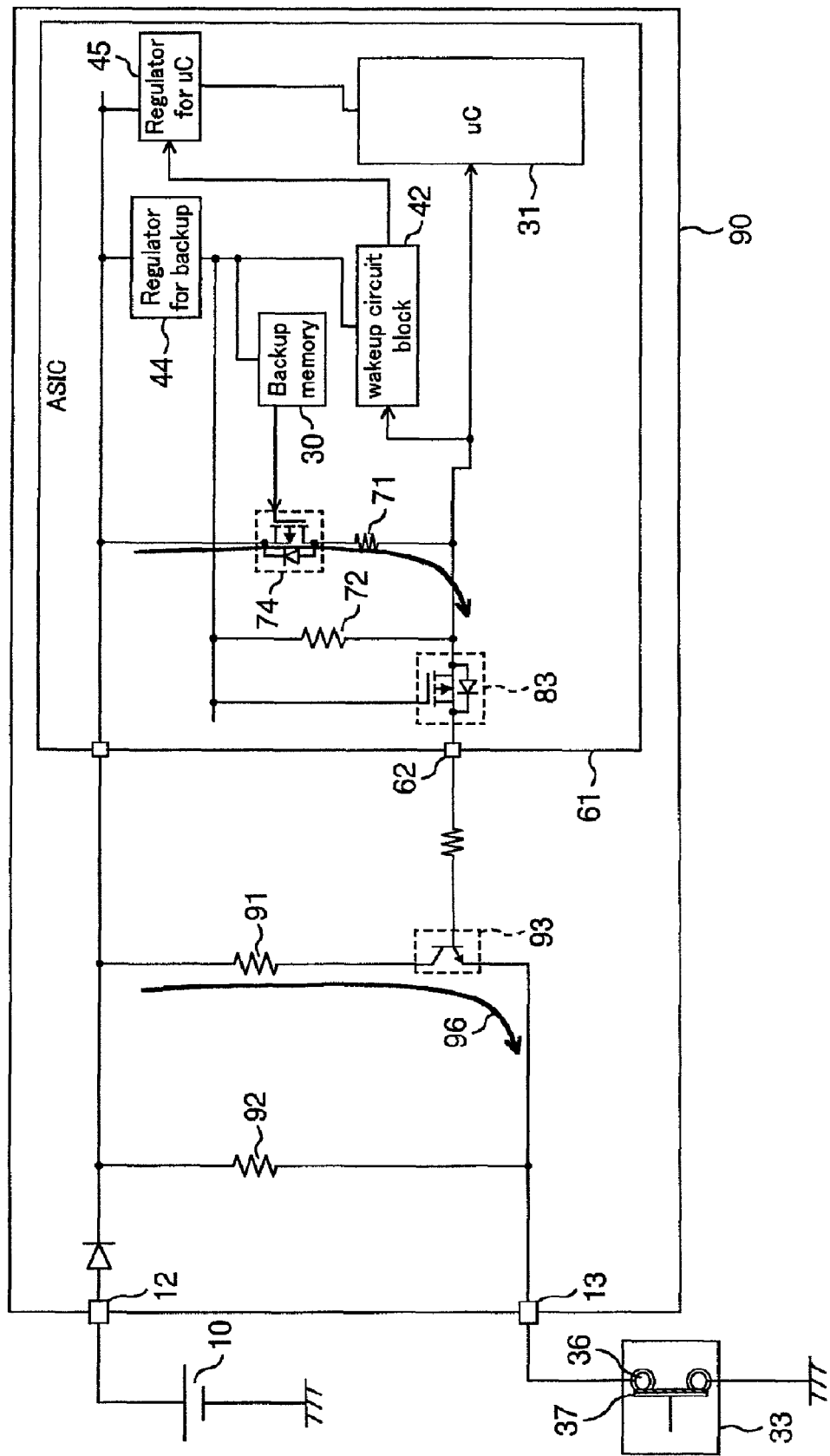
FIG. 10 is a circuit diagram showing the internal circuitry of a seat belt motor driving apparatus according to Embodiment 5.

FIG. 10 shows the internal structure of a motor driving apparatus, 90, according to Embodiment 5.

In the present embodiment, an electrical current 96 for securing the reliability of operation of the buckle switch 33 is supplied from the terminal 12 via a diode, a resistor 91 and a transistor 93 used for current amplification. In the case of the present embodiment, the value of the electrical current 96 flowing through the buckle switch 33 can be modified by varying the resistance value of the load resistor 91 for the transistor 93 for current amplification. The value of the current for securing the reliability of operation of the buckle switch differs according to the type of vehicle on which the motor driving apparatus is mounted. However, if the buckle switch 33 is changed and the value of the current 96 for securing the reliability of operation is changed, it is possible to cope with the variation simply by changing the value of the load resistor 91.

Furthermore, in the present embodiment, the input pin 62 of the ASIC 61 incorporating the microcomputer is slightly pulled up towards the battery voltage by the use of a resistor 92 of high voltage of tens of kilohms or more (such as 1 MΩ) as long as the specifications of the dark current permit, the dark current being allowed to flow through the motor driving apparatus 90 when the buckle switch 33 is ON. Consequently, when the FET 74 and the transistor 93 for current amplification are turned off for dark current reduction under control of the ASIC 61, if the buckle switch 33 is switched from ON to OFF, the resistor 92 permits the voltage on the input pin 62 of the ASIC 61 to rise quickly. This makes it possible to increase the operating speed when the consumption current of the motor driving apparatus 90 has been reduced.

In the present embodiment, the ASIC 61 incorporating the microcomputer and used in Embodiments 2-4 can be utilized without modification. The concepts for reducing the dark current and for improving the reliability of operation of the buckle switch and control methods therefor are the same as for Embodiment 1. That is, the backup memory 30 holds the switching state of the FET 74 for controlling the path of the dark current and the switching state of the transistor 93 used for current amplification during the sleep of the ASIC 61 incorporating the microcomputer, and the wakeup circuit 42 detects the change of the state of the buckle switch 33 during the sleep of the ASIC 61.

It should be further understood by those skilled in the art that although the foregoing description has been made on embodiments of the invention, the invention is not limited thereto and various changes and modifications may be made without departing from the spirit of the invention and the scope of the appended claims.

The invention claimed:

1. A motor driving apparatus connected with a battery and a buckle switch in use, said apparatus comprising:
a control unit including a microcomputer and a wakeup circuit which wakes up the microcomputer from an asleep state based on an input signal whose logic state is switched by switching of the state of the buckle switch;
a transistor capable of being kept ON or OFF by a backup memory even if the microcomputer is asleep;
a first resistor connected in series with the transistor; and
a second resistor connected in parallel with the series connection of the first resistor and the transistor.

2. A motor driving apparatus as set forth in claim 1, wherein the logic state of said input signal is switched from LOW to HIGH when the buckle switch is switched from ON to OFF while the microcomputer is asleep, and wherein said wakeup circuit detects switching of the input signal and wakes up the microcomputer.

3. A motor driving apparatus as set forth in claim 1, wherein said microcomputer sets said backup memory so as to turn on the transistor when the microcomputer is put to sleep while the buckle switch is OFF.

4. A motor driving apparatus as set forth in claim 1, wherein the logic state of said input signal is switched from HIGH to LOW when the buckle switch is switched from OFF to ON while the microcomputer is asleep, and wherein said wakeup circuit detects switching of the input signal and wakes up the microcomputer.

5. A motor driving apparatus connected with a battery and a buckle switch in use, said apparatus having a control unit comprising:
a microcomputer;
a wakeup circuit which wakes up the microcomputer from an asleep state based on an input signal whose logic state is switched by switching of the state of the buckle switch;
a first transistor capable of being kept ON or OFF by a backup memory if the microcomputer is asleep;
a first resistor connected in series with the first transistor; and
a second resistor connected in parallel with the series connection of the first resistor and the first transistor.

6. A motor driving apparatus as set forth in claim 5, wherein a battery voltage is supplied to said first transistor, and wherein said control unit has both a second transistor, for level shifting and a buffer between an input terminal to which said input signal is applied and said wakeup circuit.

7. A motor driving apparatus as set forth in claim 6, wherein a third transistor for current amplification, a third resistor connected in series with the third transistor and being a load resistor for the third transistor, and a fourth resistor connected in parallel with the series connection of the third resistor and the third transistor are connected between said input terminal of the control unit and a connecting terminal by which the buckle switch is connected with the control unit.

8. A motor driving apparatus comprising:
a first connecting terminal connected with a battery;
a second connecting terminal connected with a buckle switch; and
a control unit including a microcomputer;
wherein the control unit has a wakeup circuit for waking up the microcomputer from an asleep state based on an input signal whose logic state is switched based on a switching signal for switching the state of the buckle switch, the switching signal being entered from the second connecting terminal, a first transistor to which a battery voltage from the first connecting terminal is applied and which is capable of being kept ON or OFF by a backup memory even if the microcomputer is asleep, a first resistor connected in series with the first transistor, and a second resistor connected in parallel with the series connection of the first resistor and the transistor;
wherein said control unit has both a second transistor, for level shifting and a buffer between an input terminal of the control unit to which the input signal is applied and the wakeup circuit; and
wherein a third transistor for current amplification, a third resistor being a load resistor for the third transistor, and a fourth resistor connected in parallel with the series connection of the third resistor and the third transistor, are connected between the input terminal of the control unit and the second connecting terminal.

* * * * *